(12) United States Patent
Betting et al.

(10) Patent No.: US 7,261,766 B2
(45) Date of Patent: Aug. 28, 2007

(54) SUPERSONIC FLUID SEPARATION ENHANCED BY SPRAY INJECTION

(75) Inventors: Marco Betting, Rijswijk (NL); Cornelis Antonie Tjeenk Willink, Rijswijk (NL)

(73) Assignee: Shell Oil Company, Houston, TX (US)

( * ) Notice: Subject to any disclaimer, the term of this patent is extended or adjusted under 35 U.S.C. 154(b) by 322 days.

(21) Appl. No.: 10/512,703

(22) PCT Filed: Apr. 29, 2003

(86) PCT No.: PCT/EP03/04704

§ 371 (c)(1),
(2), (4) Date: Oct. 27, 2004

(87) PCT Pub. No.: WO03/092858

PCT Pub. Date: Nov. 13, 2003

(65) Prior Publication Data

US 2005/0172802 A1    Aug. 11, 2005

(30) Foreign Application Priority Data

Apr. 29, 2002 (EP) .................................. 02076688

(51) Int. Cl.
*B03C 3/00* (2006.01)
(52) U.S. Cl. ................. 96/65; 95/71; 96/27; 96/53; 96/389
(58) Field of Classification Search ......... 55/468; 95/64, 65, 71, 216; 96/27, 53, 275, 323, 96/389

See application file for complete search history.

(56) References Cited

U.S. PATENT DOCUMENTS

| | | | |
|---|---|---|---|
| 3,185,181 A | 5/1965 | Demyan | 138/37 |
| 3,493,050 A | 2/1970 | Kelley et al. | 166/267 |
| 3,544,170 A | 12/1970 | Bowles | 302/28 |
| 3,559,373 A | 2/1971 | Garrett | 55/9 |
| 3,616,596 A | 11/1971 | Campargue | 55/17 |
| 3,626,665 A | 12/1971 | Fenn et al. | 55/17 |
| 3,720,263 A | 3/1973 | Murphy et al. | 166/303 |
| 3,725,271 A | 4/1973 | Giannotti | 210/65 |
| 3,892,070 A | 7/1975 | Bose | 60/279 |
| 3,894,851 A | 7/1975 | Gorman | 55/94 |
| 4,141,701 A | 2/1979 | Ewan et al. | 55/90 |
| 4,272,499 A | 6/1981 | Cason et al. | 423/242 |
| 4,292,050 A | 9/1981 | Linhardt et al. | 55/1 |
| 4,308,134 A | 12/1981 | Lilleker et al. | 209/211 |
| 4,531,584 A | 7/1985 | Ward | 166/265 |
| 4,541,845 A | 9/1985 | Michel-Kim | 55/17 |

(Continued)

FOREIGN PATENT DOCUMENTS

DE    2243926    3/1974

(Continued)

*Primary Examiner*—Duane Smith
*Assistant Examiner*—Sonji Turner

(57) ABSTRACT

The separation of liquid and/or solid components from a multiphase fluid stream passing through a supersonic fluid separator is enhanced by injecting a surface active agent into the fluid stream passing through the separator. Preferably the spray is injected via an injection tube that has a positive or negative electrical potential, whereas one of the walls of the separator housing has an opposite electrical potential, so that the injected spray and any liquid droplets and/or particles formed around the injected nuclei are induced to flow towards said electrically loaded wall.

13 Claims, 1 Drawing Sheet

U.S. PATENT DOCUMENTS

| | | | |
|---|---|---|---|
| 4,823,880 A | 4/1989 | Klatt | 166/373 |
| 5,261,242 A | 11/1993 | Lardinois | 62/11 |
| 5,444,684 A | 8/1995 | Yanagi et al. | 369/44.28 |
| 5,794,697 A | 8/1998 | Wolflick et al. | 166/265 |
| 6,280,502 B1 | 8/2001 | van Veen | 95/29 |
| 6,372,019 B1 | 4/2002 | Ivanovich et al. | 95/29 |
| 6,447,574 B1 * | 9/2002 | Frier et al. | 95/29 |
| 6,513,345 B1 * | 2/2003 | Betting et al. | 62/637 |
| 6,524,368 B2 | 2/2003 | Betting et al. | 95/29 |
| 6,962,199 B1 * | 11/2005 | Tjeenk Willink | 166/265 |
| 2002/0194988 A1 | 12/2002 | Betting et al. | 95/29 |
| 2003/0145724 A1 | 8/2003 | Betting et al. | 95/29 |

FOREIGN PATENT DOCUMENTS

| | | |
|---|---|---|
| DE | 10040015 | 2/2002 |
| EP | 0496128 | 7/1992 |
| EP | 0711903 | 5/1996 |
| GB | 1103130 | 2/1968 |
| GB | 2037610 | 7/1980 |
| JP | 63165849 | 7/1988 |
| JP | 02017921 | 1/1990 |
| NL | 8901841 | 2/1991 |
| RU | 1768242 | 10/1992 |
| SU | 593717 | 2/1978 |
| SU | 1172540 | 8/1985 |
| WO | 99/01194 | 1/1999 |
| WO | 01/21286 | 3/2001 |

* cited by examiner

SUPERSONIC FLUID SEPARATION ENHANCED BY SPRAY INJECTION

The present application claims priority on European Patent Application 02076688.7 filed 29 Apr. 2002.

FIELD OF THE INVENTION

The invention relates to a method of enhancing fluid separation in a supersonic fluid separator by injecting a spray into the fluid stream to promote nucleation of large liquid droplets and/or solid particles.

BACKGROUND OF THE INVENTION

Such a method is known from Japanese patent publication JP2017921.

In the known method a seed is injected into a cyclonic fluid separator in which the fluid is accelerated to a supersonic velocity and thereby cooled to cause condensation and/or solidification of one or more components of a substantially gaseous multicomponent fluid mixture. The seed is injected downstream of a throat portion of the acceleration section to promote nucleation of large liquid droplets and/or solid particles in the fluid stream, in which a swirling motion is generated to initiate separation of a primary condensables depleted stream from a secondary condensables enriched stream by centrifugal forces.

In the known method the seed is recovered by a method of sedimentation, which indicated that the seed comprises a powder of solid particles. The method does not specify the composition of these particles.

The method according to the preamble of claim 1 is known from U.S. Pat. No. 4,141,701. In the known method a polluted air stream is accelerated to a supersonic velocity and water droplets are sprayed into the accelerated air stream to remove the pollutants.

German patent application No. DE 10040015 discloses the use of droplets comprising a surface active agent to remove pollutants from a gas.

In some embodiments the present invention provides a method wherein a spray is injected into the supersonic fluid stream, which spray comprises solid or liquid particles and/or droplets having a composition and/or electrical polarity which further enhances the separation efficiency of a supersonic fluid separator.

SUMMARY OF THE INVENTION

The method according to the present invention for enhancing the separation of liquid and/or solid components from a supersonic multiphase fluid stream comprises the step of injecting a spray comprising a surface active hydrocarbon composition into the fluid stream.

It is preferred that the surface active hydrocarbon composition predominantly comprises hydrocarbons having a carbon number between 1 and 16.

It is furthermore preferred that the spray comprises electrically laden droplets and/or particles.

In such case it is preferred that the fluid separator comprises a separation section of which at least one wall is electrically laden at an electrical polarity, which is opposite to the polarity of the electrical droplets and/or particles.

The separator may comprise a slit-shaped flow restriction in which the fluid stream is accelerated to a supersonic velocity, a slit-shaped separation section downstream of said flow restriction, a spray injection tube which injects a spray comprising electrically laden droplets and/or particles into the interior of the separator and wherein the inner surface of one of the walls of the slit-shaped separation section has an electrical polarity which is opposite to the polarity of the electrically laden droplets and/or particles.

It is preferred that the slit-shaped separation section has an upper and a lower wall and the lower wall has an electrical polarity which is opposite to the polarity of the electrically laden droplets and the upper wall has an electrical polarity which is similar to the polarity of the electrically laden droplets and/or particles.

Alternatively, the separator may be a cyclonic separator comprising an tubular upstream acceleration section, a tubular midstream section in which the fluid stream flows in a swirling motion and a downstream separation section having an annular outer outlet in which condensables enriched fluid components are collected and a tubular inner outlet in which condensables depleted fluid components are collected, and wherein the spray is injected into the interior of the cyclonic separator at a location downstream of a throat section of the acceleration section.

BRIEF DESCRIPTION OF THE DRAWINGS

The invention will be described in more detail and by way of example with reference to the accompanying drawings in which.

DETAILED DESCRIPTION OF THE EMBODIMENTS

Figure 1:
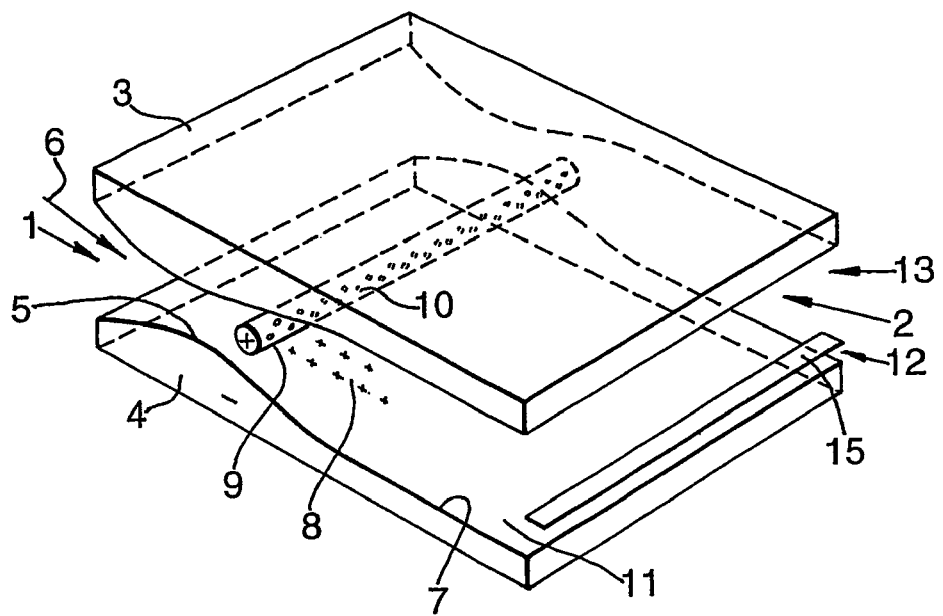
FIG. 1 is a schematic three-dimensional view of a supersonic fluid separator comprising slit shaped fluid acceleration and fluid separation sections.

Referring to FIG. 1 there is shown a supersonic fluid separator which comprises a slit-shaped acceleration section 1 and a slit-shaped separation section 2 that are arranged between profiled upper and lower walls 3 and 4 and between a pair of vertical side walls (not shown).

The profiled walls 3 and 4 define a throat section 5 in which a multicomponent substantially gaseous fluid stream 6 is accelerated to a supersonic velocity and thereby expanded and cooled and a separation section 7 downstream of the throat section 5 in which cooled and condensed components are separated from still gaseous components.

A spray 8 of a surface active agent is injected into the slit-shaped separation section 2 via small openings 10 in a spray injection tube 9 which is located just downstream of the narrowest passage of the acceleration section 1. The spray tube has a positive electrical potential so that the droplets of surface active agent also have a positive potential. The lower profiled wall 4 has a negative electrical potential in the region of the separation section 7. The droplets of surface active agent form nuclei around which condensable components form droplets and/or solid particles, which droplets and/or particles will also obtain a positive electrical potential. Thus the condensed droplets and/or solidified particles also acquire a positive electrical potential and will be attracted to the lower wall 4 that has a negative electrical potential. The droplets and/or particles will cluster together and form a liquid film or slurry at the surface of the lower wall 4, which film may flow into a slit-shaped lower condensables enriched fluid outlet passage 12, whereas the condensables depleted still gaseous components flow into a slit-shaped upper outlet passage 13, which is separated from the said lower outlet passage 12 by a flow divider 15.

Figure 2:
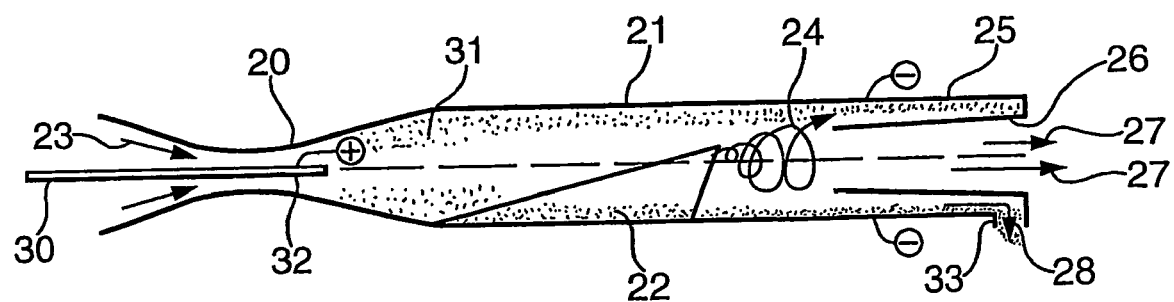
FIG. 2 is a schematic longitudinal sectional view of a cyclonic fluid separator in which a spray is injected to enhance the fluid separation efficiency.

FIG. 2 shows a cyclonic fluid separator which comprises an upstream acceleration section 20 in which a fluid stream 23 is accelerated to a supersonic velocity and thereby expanded and cooled, a tubular midstream section 21 comprising one or more wings 22 which induce a vortex 24 in the supersonic fluid stream and a downstream separation section 25 in which a tubular vortex finder 26 separates a central condensables depleted gaseous stream 27 from an annular condensables enriched stream 28.

A spray injection tube 30 extends through the acceleration section and injects a spray 31 of surface active lower hydrocarbons via small openings 32 into the separator. The tube 30 has a positive electrical potential so that the injected spray and any droplets and/or particles, which condense and/or solidify around the nuclei formed by the spray 31 also have a positive electrical potential. The inner surface of the tubular midstream section 21 and downstream separation section 25 have a negative electrical potential such that the positively loaded droplets and/or particles are attracted to the outer periphery of the separator interior and coalesce into a liquid film or slurry that flows along the inner surface of the separator housing into the annular condensable enriched outlet port 33.

The injection of a surface active spray which is preferably injected via an electrically loaded spray injection tube 30 and the use of a separation section having an inner surface having an electrical potential opposite to that of the spray injection tube 30 significantly enhances the separation efficiency of a supersonic fluid separator.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A method for enhancing the separation of one or more condensable components from a multiphase fluid stream passing through a fluid separator comprising:
   accelerating the fluid stream to a supersonic velocity thereby cooling the fluid stream and causing the one more condensable components to condense or solidify; and
   injecting a spray comprising a surface active hydrocarbon composition into the fluid stream.

2. The method of claim 1, wherein the surface active hydrocarbon composition predominantly comprises hydrocarbons having a carbon number between 1 and 16.

3. The method of claim 1, wherein the spray comprises electrically laden droplets.

4. The method of claim 3, wherein the fluid separator comprises a separation section of which at least one wall is electrically laden at an electrical polarity, which is opposite to the polarity of the electrically laden droplets.

5. The method of claim 4, wherein the separator comprises a slit-shaped flow restriction in which the fluid stream is accelerated to a supersonic velocity, a slit-shaped separation section downstream of said flow restriction, a spray injection tube which injects a spray comprising electrically laden droplets into the interior of the separator and wherein the inner surface of one of the walls of the slit-shaped separation section has an electrical polarity which is opposite to the polarity of the electrically laden droplets.

6. The method of claim 4, wherein the slit-shaped separation section has an upper and a lower wall and the lower wall has an electrical polarity which is opposite to the polarity of the electrically laden droplets and the upper wall has an electrical polarity which is similar to the polarity of the electrically laden droplets.

7. The method of claim 1, wherein the separator is a cyclonic separator comprising an tubular upstream acceleration section, a tubular midstream section in which the fluid stream flows in a swirling motion and a downstream separation section having an annular outer outlet in which condensables enriched fluid components are collected and a tubular inner outlet in which condensables depleted fluid components are collected, and wherein the spray is injected into the interior of the cyclonic separator at a location downstream of a throat section of the acceleration section.

8. The method of claim 1, wherein the surface active agent comprises an organic surfactant.

9. The method of claim 8, wherein the organic surfactant comprises molecules having a polar head and a non-polar tail.

10. The method of claim 1, wherein the spray comprises electrically laden particles.

11. The method of claim 10, wherein the fluid separator comprises a separation section of which at least one wall is electrically laden at an electrical polarity, which is opposite to the polarity of the electrically laden particles.

12. The method of claim 11, wherein the separator comprises a slit-shaped flow restriction in which the fluid stream is accelerated to a supersonic velocity, a slit-shaped separation section downstream of said flow restriction, a spray injection tube which injects a spray comprising electrically laden particles into the interior of the separator and wherein the inner surface of one of the walls of the slit-shaped separation section has an electrical polarity which is opposite to the polarity of the electrically laden particles.

13. The method of claim 12, wherein the slit-shaped separation section has an upper and a lower wall and the lower wall has an electrical polarity which is opposite to the polarity of the electrically laden particles and the upper wall has an electrical polarity which is similar to the polarity of the electrically laden particles.

* * * * *